(12) United States Patent
Sweet

(10) Patent No.: US 7,532,648 B2
(45) Date of Patent: May 12, 2009

(54) SYSTEM AND METHOD USING AN I/O MULTIPLEXER MODULE

(75) Inventor: James D Sweet, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 985 days.

(21) Appl. No.: 10/640,649

(22) Filed: Aug. 14, 2003

(65) Prior Publication Data

US 2005/0036523 A1 Feb. 17, 2005

(51) Int. Cl.
*H04J 3/04* (2006.01)
(52) U.S. Cl. .................................... 370/532
(58) Field of Classification Search ............... 370/503, 370/517–519, 532–535, 537–538; 326/37–41, 326/46–47, 16, 93–98; 716/1–21
See application file for complete search history.

(56) References Cited

U.S. PATENT DOCUMENTS

| | | | | |
|---|---|---|---|---|
| 6,071,314 A | * | 6/2000 | Baxter et al. | 716/17 |
| 6,208,162 B1 | * | 3/2001 | Bocchino | 326/38 |
| RE37,195 E | * | 5/2001 | Kean | 326/39 |
| 6,639,422 B1 | * | 10/2003 | Albean | 326/16 |

* cited by examiner

*Primary Examiner*—Thai D Hoang
(74) *Attorney, Agent, or Firm*—Sterne, Kessler, Goldstein & Fox P.L.L.C.

(57) ABSTRACT

A system (e.g., a chip) includes first and second function blocks (e.g., function blocks) coupled to an input/output (I/O) device (e.g., a bi-directional pin or pad) via a multiplexing module. The multiplexing module can be used for both input and output of signals between the function blocks and the I/O device. Optionally, a re-clocking system is coupled to the function blocks, the I/O device, and the multiplexing module. The re-clocking system re-clocks one or more signals being input into the multiplexing module so that they are timed correctly for input or output from the system.

11 Claims, 2 Drawing Sheets

SYSTEM AND METHOD USING AN I/O MULTIPLEXER MODULE

BACKGROUND OF THE INVENTION

1. Field of the Invention

The present invention is related to multiplexing signals between a plurality of function blocks and an input/output (I/O) device on a chip.

2. Background Art

Chips are being manufactured that include increasingly more function blocks. The chips communicate with other chips through I/O devices (e.g., pins or pads). While function blocks are becoming smaller, and the chips denser, there is limited area on the chip for the I/O devices. To compensate for the limited area, groups or sets of the function blocks share the I/O devices.

In order to share the I/O devices, a controlling system (e.g., a multiplexer) is used to direct which of the function blocks use the I/O device at a particular time (e.g., during a particular mode of the chip).

In some conventional systems, controlling which of the sets of function blocks transmit or receive signals via the I/O device is done using pairs of multiplexers. One multiplexer is used to output enables from the I/O device and one multiplexer is used to output data from the I/O device. However, a control system can further add to the density of the chip and reduce available space for function blocks. In other systems, signals from at least one other function block can be sent to a semiconductor closest to the I/O device, and that closest semiconductor controls signal transmission. Generally speaking, input signals do not need a multiplexer because the input is simply wired to multiple locations. There is no multiplexing to be done on the input signal itself However, there is a multiplexer on the output enable so that the receiver of the input signal can control the pin direction.

Conventional chips require the function blocks to be close to their respective I/O device. This is because timing of transmitting and receiving signals off the chip through the I/O device is critical for operation. The timing of a transmitted signal should be predictable compared to a specific time or event of a clock signal. This is especially true if the signals are relatively fast (e.g., about 100 MHz or above). Fast signals that are mistimed as compared to a clock controlling a function block receiving the signal can cause operational errors or failure of the chip or a system employing the chip.

Mis-timing during testing of the chip can cause a false error signal. For example, during testing, if a testing system is expecting a desired output during a specified clock cycle and the timing is incorrect, the chip may be designated faulty when it is not.

Chips behave differently depending on process, temperature, and voltage. The same signal can be fast or slow depending on the process, temperature, and voltage for that specific chip. When the slow conditions exist, that is commonly referred to as the worst-case comer. When the best-case conditions exist, that is called the best-case comer. The relationship of a signal's transition relative to a specific clock period must be maintained for both best-case and worst-case timing comers.

Having these above described limitations can substantially reduce flexibility in designing a layout of the chip.

Therefore, what is needed is a chip having a control device that can control input and output signals between function blocks and an I/O device that does not require the function blocks being controlled to be in any particular location on the chip.

BRIEF SUMMARY OF THE INVENTION

Embodiments of the present invention provide a system including an input/output (I/O) device that transmits and receives signals. Function blocks that transmit and receive the signals. An I/O multiplexing module that controls transmission of the signals between the function blocks and the I/O device using a controller.

Other embodiments of the present invention provide a system including an input/output (I/O) device that transmits and receives signals. Function blocks that transmit and receive the signals. An I/O multiplexer that controls transmission of the signals between the function blocks and the I/O device. The system can further include a re-clocking device that re-clocks a subset of the signals before the subset of the signals are input to the I/O multiplexer.

Still other embodiments of the present invention provide a system including a device for inputting and outputting signals. First and second devices for processing the signals. A device for multiplexing the signals between the first and second devices that process and the device for inputting and outputting. The system can further include a device for re-clocking a subset of the signals before they are received at the device for multiplexing.

Still further embodiments of the present invention provide an integrated circuit I/O system including a terminal pad. A multiplexer including an output coupled to the terminal pad and coupled to inputs of on-chip function blocks. The multiplexer includes a plurality of data inputs coupled to outputs of respective one of the on-chip function blocks and a data input coupled to the terminal pad. A control register can be coupled to the multiplexer. The control register selectively controls the multiplexer to couple an output of one of the function blocks with the terminal pad or an input of one of the function blocks to a terminal pad. The system can also include a re-clocking device.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
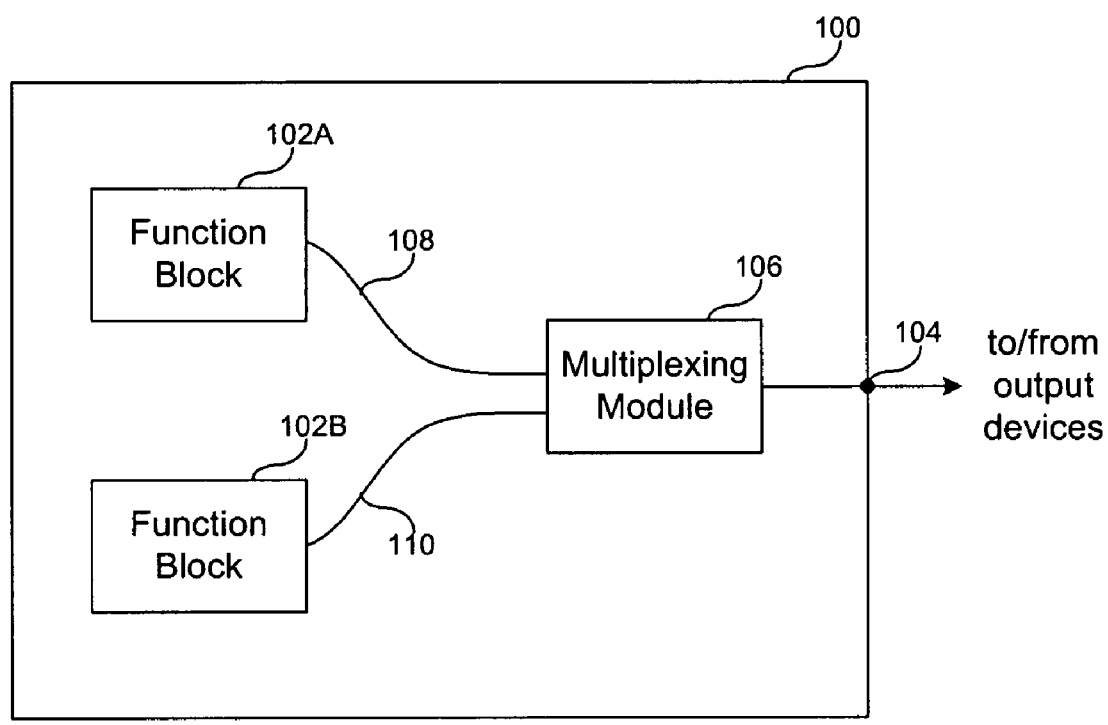
FIG. 1 shows a block diagram of a system according to embodiments of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the present invention provide a system (e.g., a chip) that includes at least first and second function blocks (e.g., function blocks) coupled to an input/output (I/O) device (e.g., a bidirectional pin or pad) via a multiplexing module (e.g., a multiplexing system controlled by a single controller). The multiplexing module can be used for both input and output of signals between the function blocks and the I/O device. In one example, each function block can be designated for operation during a certain mode of the chip.

In one embodiment, a re-clocking system is coupled to the function blocks, the I/O device, and the multiplexing module. The re-clocking device can be used to re-clock one or more signals before being input into the multiplexing module so that the signals are timed correctly for input or output from the system.

Therefore, the addition and usage of the re-clocking registers in the multiplexing module eliminates the need for the functional blocks to be in particular locations.

System and Multiplexing Module

FIG. 1 shows a system (e.g., a chip) 100 according to embodiments of the present invention. Chip 100 includes two function blocks 102 (e.g., 102A, 102B, etc.) coupled to an I/O device 104 via a multiplexing module 106. Although only two function blocks 102 are shown, it is to be appreciated any number of function blocks 102 can be used in chip 100 and/or can be controlled with multiplexing module 106 within the scope of the present invention. Function blocks 102 can include any device (e.g., function block) or group of devices, as would be known to a skilled artisan. In one example, each function block 102 can be designated to operate during a specific mode of chip 100.

For example, chip 100 can be a TV-on-a-Chip having various devices 102 used to process and control TV signals transmitted and received via I/O device 104. Multiplexing module 106 allows for a single device placed anywhere in chip 100 to control signals between function blocks 102 and I/O device 104.

Re-Clocking Device

Figure 2:
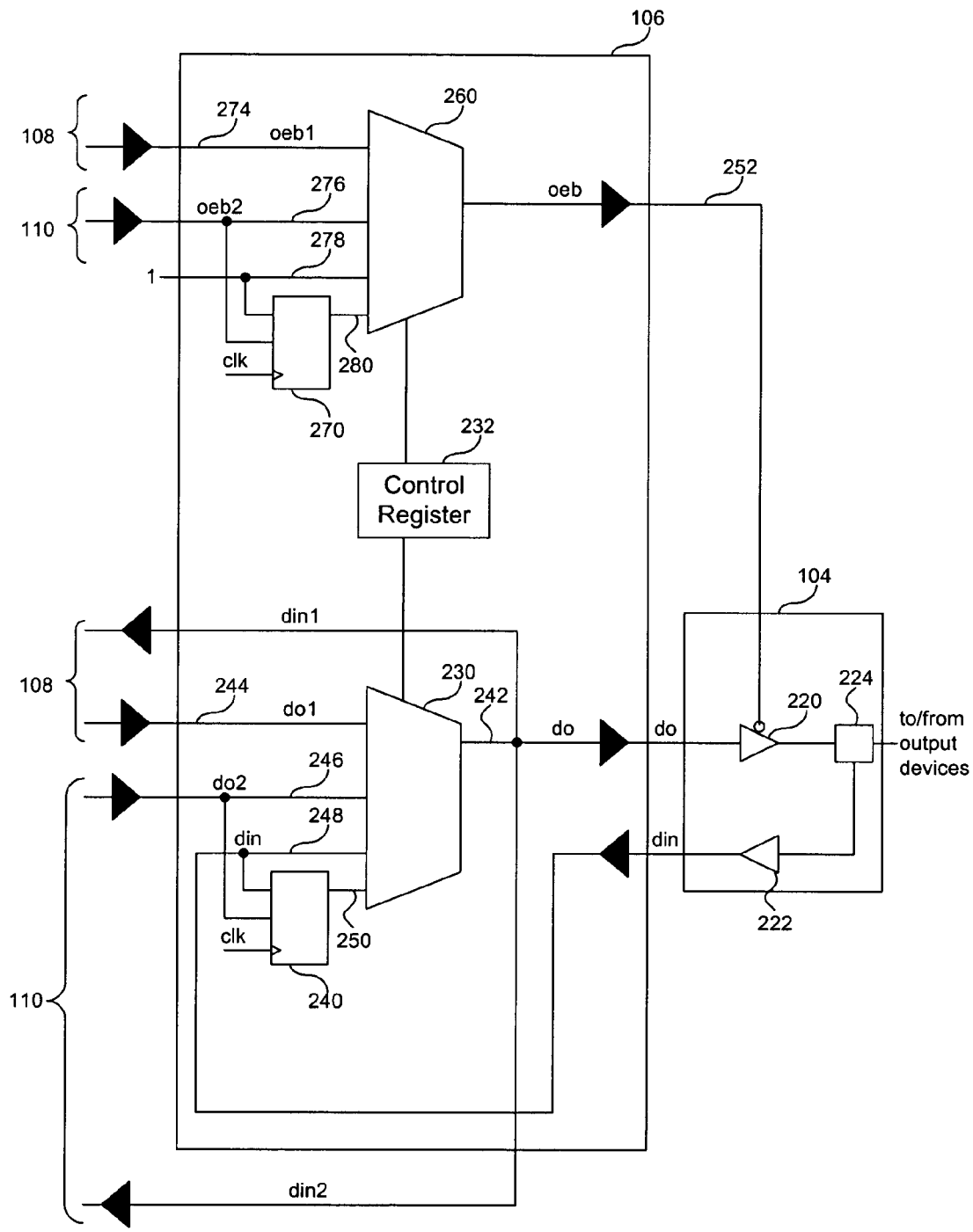
FIG. 2 shows a schematic diagram for part of the system in FIG. 1 according to embodiments of the present invention.

FIG. 2 is a schematic diagram of a multiplexing module 106 and I/O device 104 according to an embodiment of the present invention. In the example shown, function blocks 102 and I/O device 104 transmit and receive data (e.g., data in (din), data out (do), etc.) and output enable (Oeb) signals. It is to be appreciated that other types of signals can be transmitted and received, as would be known to a skilled artisan.

I/O device 104 can include an output device 220, an input device 222, and a pad or pin 224. An enable signal Oeb 252 controls operations of output device 220 or input device 222, respectively, when it is active.

Multiplexing module 106 includes a multiplexer 230 coupled to a control system 232 (e.g., a control register). Although shown as part of multiplexing module 106, control register 232 is typically part of a bank of registers centrally located outside multiplexing module 106. Control register 232 controls multiplexer 230 to couple an output terminal 242 of multiplexer 230 to one of input terminals 244, 246, 248, or 250. In the configuration shown, input terminal 244 is coupled to function block 102A, input terminal 246 is coupled to function block 102B, input terminal 248 is coupled to input device 222, and input terminal 250 is coupled to a re-clocking device 240.

The control register also controls multiplexer 260 to couple the output terminal 252 of multiplexer 260 to one of input terminals 274, 276, 278, or 280. The controls for multiplexer 260 track those of multiplexer 230. Thus, multiplexer 230 and multiplexer 260 can be considered a multiplexing system. That is, when 244 is selected at multiplexer 230, then 274 is selected at multiplexer 260. When 246 is selected at multiplexer 230, then 276 is selected at multiplexer 260, and so on. In the configuration shown, input terminal 274 is coupled to functional block 102A, and input terminal 276 is coupled to functional block 102B. Input terminal 278 is tied high because any time input device 222 is being used, the output enable 252 must be set high to select input mode (in which output device 220 must not be driving).

When a signal has a relatively high data rate (e.g., about 100 MHz or above), operational errors can occur if the signal becomes out of synch with a clock signal, as was discussed above. This can happen when, for example, the fast signal travels relatively far through the chip, either from a function block 102 or from I/O device 104, to multiplexing module 106. To compensate, multiplexing module 106 can also include re-clocking device 240 (e.g., a flip-flop, or the like). Re-clocking device 240 resets a clock period associated with a received signal to synchronize the received signal with a system clock using known functionality in a flip-flop. Re-clocking device 240 can receive both input signals from I/O device 104 and output signals from function blocks 102. To compensate for delay (e.g., the travel time and/or distance) the fast signal can be re-clocked. Re-clocking device 240 re-clocks the fast signal so that it is again in synch with a desired clock signal. Similar to re-clocking device 240, the re-clocking device 270 is used to avoid timing problems on the output enables and to keep the output enables synchronized with the output data. Re-clocking devices 240 and 270 can be considered a re-clocking system.

It is to be appreciated that one or more re-clocking devices 240 can be used for re-clocking signals before they reach one or more input terminals of multiplexer 230. A number of re-clocking devices 240 can depend on a number of signals that need to be re-clocked. Since multiplexers 230 and 260, as well as reclocking devices 240 and 270, work in conjunction with each other and track each other's operations, the number of re-clocking devices 270 will match the number of reclocking devices 240.

In one example, when a test is being performed on function blocks 102 in chip 100, a desired signal needs to be output from system 100 at a specified time. The specified time is based on a clock signal. Through the traveling, a fast signal may be delayed relative to its original clock and relative to a clock driving a testing system (not shown). Thus, there can be a problem sampling the fast signal because a test output signal output from system 100 may no longer be repeatable and predictable. Thus, using re-clocking system 240 allows the tested signal to be re-clocked to be in synch with an output clock signal.

In another example, operational problems can occur due to a device that interfaces with chip 100. If chip 100 interfaces with a load running on a same clock as a function block transmitting the fast signal, the delay cannot be in a range where the fast signal is changing around a clock edge. If this occurs, this can lead to instability. Thus, using re-clocking system 240 allows chip 100 to make the delay substantially smaller because the fast signal is resynchronized with the clock signal, which substantially reduces any delay. A small delay results in a repeatable, predictable, and controllable output signal from chip 100.

Operation

Operation of chip 100 is now described by way of examples. For these examples, function block 102A is presumed to be relatively near the multiplexer 230, so re-clocking is not necessary. Function block 102B is presumed to be relatively far from the multiplexer 230, so that inputs to and outputs from function block 102B need to be re-clocked.

Outputting Data

In a first instance, output data do1 from function block 102A is received at an input terminal 244 of multiplexer 230. Control register 232 controls the multiplexer 230 to couple input terminal 244 to output terminal 242 of multiplexer 230. This allows output data do1 to go through multiplexer 230. Oeb signal 252 controls output device 220 to output data do1 to pad 224 to a subsequent chip (not shown).

The Oeb signal 252 comes from multiplexer 260, which is also controlled by control register 232. When the control register 232 couples input terminal 244 to output terminal 242 of multiplexer 230, it also couples input terminal 274 to output terminal 252 of multiplexer 260. This allows the output enable control of 220 to come from function block 102A. In this example, when function block 102A is using the shared pin as an output, function block 102A would set 274 low to turn on the output driver 220.

In another instance, output data do2 from function block 102B is received at an input terminal 246 and to an input terminal of the re-clocking device 240. The control register controls whether the data do2 is passed directly through the multiplexer 230 or through re-clocking device 240. Since data d02 is from a function block 102B that is presumed relatively far from multiplexer 230, data do2 is passed through re-clocking device 240 and input into multiplexer 230 at input terminal 250. Control register 232 controls multiplexer 230 to couple input terminal 250 to output terminal 242 of multiplexer 230. This allows output data do2 to go through multiplexer 230. Oeb signal 252 controls output device 220 to output data do2 to pad 224 and to a subsequent chip.

The output enable corresponding to do2 also comes from function block 102B and is received at input terminal 276 and to an input terminal of the re-clocking device 270. The control register 232 controls whether the output enable Oeb2 is passed directly through the multiplexer 260 or through the re-clocking device 270. This selection will match whatever selection is made for whether do2 is re-clocked or not. In this example, since function block 102B is using the shared pin 224, the output enable Oeb2 is passed through re-clocking device 270 and input into multiplexer 260 at terminal 280 and subsequently to 252.

Multiplexing module 106 can also provide a path from 246 to 242, which could be selected by control register 232 when the do2 signal is transmitted out of the chip without re-clocking. This can be desirable when a multiplexing module 106 is used for many different pins. Depending on the application, re-clocking may or may not be desired.

Inputting Data

Chip 100 can also receive data at pad 224 and provide the data to one or more of function blocks 102. When an input signal din is received at pad 224, it is provided to input terminal 248 of multiplexer 230. Optionally, din can be provided to an input terminal of re-clocking device 240. The control register 232 controls whether the input data din is passed directly through the multiplexer 230 or through the re-clocking device 240. If input data din is to be provided to a function block 102 that is relatively far from multiplexer 230, the input data din is passed through re-clocking device 240 and is received at input terminal 250 of multiplexer 230. Control register 232 controls multiplexer 230 to couple input terminal 250 to output terminal 242 of multiplexer 230. This allows input data din to go through multiplexer 230. Then, input data din can be transmitted to one or both of function block 102A as din1 and/or function block 102B as din2.

In this example, when function block 102A is close and function block 102B is far, control register 232 would select the reclocked path (250-242) when function block 102B is using the pin and the non-reclocked path (248-242) when 102A is using it. Since the shared pin 224 is being used as an input in both of these cases, the output enable corresponding to these cases (278) is simply tied to a 1, which ultimately turns off the driver 220.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
an input/output (I/O) device;
function blocks coupled to the I/O device;
an I/O multiplexing module that controls transmission of the signals between the function blocks and the I/O device using a controller, and
a data synchronizing device configured to receive a system clock signal,
wherein the I/O multiplexing module comprises:
data and enable I/O multiplexers coupled to the controller; and
data and enable synchronizing devices coupled to the I/O device, the function blocks, and the data and enable I/O multiplexers, respectively, wherein the data and enable synchronizing devices synchronize one or more of the signals with a system clock before the one or more signals enter the data and enable I/O multiplexers, respectively.

2. The system of claim 1, wherein the I/O multiplexing module is positioned adjacent the I/O device.

3. The system of claim 1, wherein:
a set of the signals from the functions blocks are designated fast signals, the fast signals comprise signals of about 100 MHz or above, and the fast signals are synchronized using the synchronizing device before being processed in the I/O multiplexing module.

4. The system of claim 1, wherein the signals comprise data signals and Oeb signals.

5. The system of claim 1, further comprising a control device coupled to a control input of the I/O multiplexing module.

6. The system of claim 1, wherein:
a set of the signals from the function blocks are transmitted at 108 MHz and these signals are synchronized using the synchronizing device before being processed in the I/O multiplexing module.

7. A system comprising:
an input/output (I/O) device;
function blocks coupled to the I/O device;
an I/O multiplexing module that controls transmission of the signals between the function blocks and the I/O device using a controller; and
a data synchronizing device configured to receive a system clock signal,
wherein the I/O multiplexing module comprises:
   a data I/O multiplexer coupled to the controller; and
   an enable I/O multiplexer coupled to the controller,
wherein the data synchronizing device is coupled to the I/O device, the function blocks, and the data I/O multiplexer, wherein the synchronizing device synchronizes one or more of the signals with a system clock before the one or more signals enter the data I/O multiplexer; and
wherein the I/O multiplexing module further comprises an enable synchronizing device coupled to the I/O device, the function blocks, and the enable I/O multiplexer, wherein the enable synchronizing device synchronizes one or more of the signals with a system clock before the one or more signals enter the enable I/O multiplexer.

8. A system comprising:
an input/output (I/O) device;
function blocks coupled to the I/O device;
an I/O multiplexing system that controls transmission of the signals between the function blocks and the I/O device, the I/O multiplexing system comprising,
   data and enable I/O multiplexers coupled to the controller, and
   data and enable synchronizing devices coupled to the I/O device, the function blocks, and the data and enable I/O multiplexers, respectively, wherein the data and enable synchronizing devices synchronize one or more of the signals with a system clock before the one or more signals enter the data and enable I/O multiplexers, respectively; and
a synchronizing system.

9. The system of claim 8, the synchronizing system is configured to synchronize a subset of the signals before the subset of the signals are input to the I/O multiplexing system.

10. The system of claim 8, further comprising a single controller to control the I/O multiplexing system.

11. An integrated circuit I/O system comprising:
a terminal pad;
enable and data multiplexers including outputs coupled to the terminal pad and coupled to inputs of on-chip function blocks, the enable and data multiplexers including a plurality of enable and data inputs coupled to respective outputs of the on-chip function blocks, the plurality of enable and data inputs including an enable input coupled to the terminal pad;
a control register coupled to the enable and data multiplexers; and
enable and data synchronizing devices configured to synchronize one or more of the signals with a system clock before the one or more signals enter the terminal pad,
wherein the control register selectively controls the enable and data multiplexers to couple an output of one of the function blocks with the terminal pad or an input of one of the function blocks with the terminal pad.

* * * * *